US009816204B2

(12) United States Patent
He et al.

(10) Patent No.: US 9,816,204 B2
(45) Date of Patent: Nov. 14, 2017

(54) GELATINIZED PRE-ORIENTED FILAMENTS AND PREPARATION METHOD THEREOF, AND ULTRA-HIGH MOLECULAR WEIGHT POLYETHYLENE FIBERS AND PREPARATION METHOD THEREOF

(75) Inventors: Peng He, Beijing (CA); Xingliang Huang, Beijing (CN); Fengqi Lin, Beijing (CN)

(73) Assignee: BEIJING TONGYIZHONG SPECIALTY FIBRE TECHNOLOGY & DEVELOPMENT CO., LTD, Beijing (CN)

( * ) Notice: Subject to any disclaimer, the term of this patent is extended or adjusted under 35 U.S.C. 154(b) by 547 days.

(21) Appl. No.: 14/350,851

(22) PCT Filed: Jun. 8, 2012

(86) PCT No.: PCT/CN2012/076619
§ 371 (c)(1),
(2), (4) Date: Apr. 10, 2014

(87) PCT Pub. No.: WO2013/053239
PCT Pub. Date: Apr. 18, 2013

(65) Prior Publication Data
US 2014/0288256 A1    Sep. 25, 2014

(30) Foreign Application Priority Data
Oct. 11, 2011 (CN) .......................... 2011 1 0306879

(51) Int. Cl.
| D01F 6/04 | (2006.01) |
| D01F 6/06 | (2006.01) |
| D01D 5/098 | (2006.01) |
| D01D 5/12 | (2006.01) |
| C08F 110/02 | (2006.01) |
| D01D 5/088 | (2006.01) |
| D02J 1/22 | (2006.01) |
| D01D 1/02 | (2006.01) |
| D01D 5/04 | (2006.01) |
| D01D 5/06 | (2006.01) |
| D01F 6/46 | (2006.01) |

(52) U.S. Cl.
CPC ............ D01D 5/098 (2013.01); C08F 110/02 (2013.01); D01D 1/02 (2013.01); D01D 5/04 (2013.01); D01D 5/06 (2013.01); D01D 5/088 (2013.01); D01D 5/12 (2013.01); D01F 6/04 (2013.01); D01F 6/46 (2013.01); D02J 1/22 (2013.01)

(58) Field of Classification Search
None
See application file for complete search history.

(56) References Cited

U.S. PATENT DOCUMENTS

| 4,422,993 | A | 12/1983 | Smith et al. |
| 5,443,904 | A | 8/1995 | Ohta et al. |
| 5,547,626 | A | 8/1996 | Ohta et al. |
| 7,638,191 | B2 | 12/2009 | Tam et al. |
| 7,736,561 | B2 | 6/2010 | Tam et al. |
| 8,188,206 | B2 | 5/2012 | Ren |
| 8,747,715 | B2 | 6/2014 | Tam et al. |
| 9,005,753 | B2 | 4/2015 | Simmelink et al. |
| 2008/0171202 | A1* | 7/2008 | Wu ............................ D01F 6/46 428/373 |
| 2008/0290550 | A1 | 11/2008 | Da Cunha et al. |
| 2008/0305331 | A1 | 12/2008 | Tam et al. |
| 2010/0065982 | A1* | 3/2010 | Tam ......................... D01D 5/06 264/178 F |
| 2010/0122517 | A1 | 5/2010 | Simmelink et al. |
| 2010/0187716 | A1 | 7/2010 | Yang et al. |
| 2010/0204427 | A1 | 8/2010 | Ren |
| 2010/0286728 | A1 | 11/2010 | Simmelink et al. |
| 2011/0266710 | A1 | 11/2011 | Tam et al. |
| 2011/0269359 | A1 | 11/2011 | Tam et al. |
| 2013/0143987 | A1* | 6/2013 | He ............................ D01D 1/02 524/161 |
| 2014/0103568 | A9 | 4/2014 | Tam et al. |
| 2014/0283674 | A1 | 9/2014 | Tam et al. |
| 2014/0288256 | A1 | 9/2014 | He et al. |
| 2015/0191851 | A1 | 7/2015 | Simmelink et al. |

FOREIGN PATENT DOCUMENTS

| CN | 101122051 A |   | 2/2008 |
| CN | 101230501 A |   | 7/2008 |
| CN | 101307507 A | * | 11/2008 |
| CN | 101525778 A | * | 9/2009 |
| CN | 101575742 A |   | 11/2009 |

(Continued)

OTHER PUBLICATIONS

Machine translation of CN 101525778 A by Google Patents Oct. 17, 2016.*
Machine translation of CN 101307507 A by Google Patents Oct. 17, 2016.*

(Continued)

Primary Examiner — Lisa Herring
(74) Attorney, Agent, or Firm — Harness, Dickey & Pierce, P.L.C.

(57) ABSTRACT

A method for preparing gelatinized pre-oriented filaments and the gelatinized pre-oriented filaments prepared by the method are provided. The method includes feeding a spinning dope into a twin-screw extruder for blending and extruding the spinning dope to obtain a first spinning solution having a non-Newtonian index of 0.1-0.8 and a structural viscosity index of 10-50, feeding the first spinning solution into a spinning box and drawing at a spinneret with a factor of 5-20 to obtain a second spinning solution, and flash cooling and curing the second spinning solution to obtain the gelatinized pre-oriented filaments. Also provided are a method for preparing ultra-high molecular weight polyethylene fibers and ultra-high molecular weight polyethylene fibers prepared by the method.

12 Claims, No Drawings

(56) References Cited

FOREIGN PATENT DOCUMENTS

| | | | | |
|---|---|---|---|---|
| CN | 101575743 | A | | 11/2009 |
| CN | 101629326 | A | * | 1/2010 |
| CN | 101680124 | A | | 3/2010 |
| CN | 101768786 | A | | 7/2010 |
| CN | 101956238 | A | | 1/2011 |
| CN | 101956238 | A | * | 1/2011 ............... D01D 1/02 |
| CN | 102433597 | A | | 5/2012 |
| EP | 2610374 | A1 | | 7/2013 |
| EP | 2767622 | A1 | | 8/2014 |
| JP | H07166414 | A | | 6/1995 |
| JP | 2003286614 | A | | 10/2003 |
| JP | 2010525184 | A | | 7/2010 |
| JP | 2010529319 | A | | 8/2010 |
| JP | 2010540791 | A | | 12/2010 |
| WO | WO-2008/131925 | A1 | | 11/2008 |
| WO | WO-2013053239 | A1 | | 4/2013 |

OTHER PUBLICATIONS

Machine translation of CN 101629326 A by Google Patents Oct. 17, 2016.*

English Translation of Liang et al., "Rheological Study on Ultra-high-molecular Weight Polyethylene Gel", China Synthetic Fiber Industry, vol. 28, No. 2, Apr. 2005, pp. 27-29, Translation Performed by FLS, Inc. Oct. 2016.*

Machine Translation of CN101525778A Performed by Schreiber Translations, Oct. 2016.*

Liang Linli et al., Rheological study on ultrahigh molecular weight polyethylene gel, Chinese Synthetic Fiber Industry, Apr. 2005, vol. 28, No. 2, pp. 27, 28 and 29, ISSN 1001-0041 (in Chinese with English Abstract).

International Search Report (in Chinese with English translation) and Written Opinion (in Chinese) for PCT/CN2012/076619, dated Aug. 9, 2012; ISA/CN.

"Study on rheological Behavior of High-concentration Ultra High Molecular Weight Polyethylene Gel" 1994-2013 China Academic Journal Electronic Publishing House.

First Chinese Office Action regarding Application No. 201110306879.9 dated Jul. 16, 2013. Partial translation provided by Unitalen Attorneys at Law.

Extended European Search Report regarding Application No. 12839982.1, dated Apr. 17, 2015.

First Australian Office Action regarding Application No. 2012323656, dated May 7, 2015.

First Canadian Office Aciton regarding Application No. 2851740, dated Apr. 8, 2015.

Second Japanese Office Action regarding Application No. 2014534923 dated Feb. 25, 2016. English translation provided by Unitalen Attorneys at Law.

Second Korean Office Action regarding Application No. 1020147012626 dated Feb. 29, 2016. English translation provided by Unitalen Attorneys at Law.

* cited by examiner

GELATINIZED PRE-ORIENTED FILAMENTS AND PREPARATION METHOD THEREOF, AND ULTRA-HIGH MOLECULAR WEIGHT POLYETHYLENE FIBERS AND PREPARATION METHOD THEREOF

CROSS-REFERENCE TO RELATED APPLICATIONS

This application is a 371 U.S. National Stage of International Application No. PCT/CN2012/076619 filed Jun. 8, 2012, which claims priority to Chinese patent application number 201110306879.9, filed Oct. 11, 2011, with the title of GELATINIZED PRE-ORIENTED FILAMENTS AND PREPARATION METHOD THEREOF, AND ULTRA-HIGH MOLECULAR WEIGHT POLYETHYLENE FIBERS AND PREPARATION METHOD THEREOF, the disclosures of which are incorporated herein by reference in their entirety.

The application claims the priority of the Chinese patent application with application number 201110306879.9, with the title of gelatinized pre-oriented filaments and preparation method thereof, and ultra-high molecular weight polyethylene fibers and preparation method thereof, and submitted with the SIPO on Oct. 11, 2011, which is incorporated herein in its entirety by reference.

FIELD OF THE INVENTION

The present invention relates to a method for preparing fibers, in particular to gelatinized pre-oriented filaments and preparation method thereof and ultra-high molecular weight polyethylene fibers and preparation method thereof.

BACKGROUND OF THE INVENTION

Ultra-high molecular weight polyethylene (UHMWPE), also known as high strength and high modulus polyethylene fibers, refers to high performance fibers prepared from polyethylene with a relative molecular weight of more than 1 million, through spinning, extracting, drying and ultra-stretching sequentially. Fiber reinforced composites prepared by use of the ultra-high molecular weight polyethylene fibers have the advantages of light weight, impact resistance, high dielectric property, etc., widely applied in aerospace field, sea area defense field, weapon equipment field and everyday industrial field.

In the prior art, the ultra-high molecular weight polyethylene fibers are generally prepared by use of gel spinning technique, created by DSM company in Netherlands firstly. In the gel spinning technique, polyethylene with a relative molecular weight of more than 1 million is commonly used as a raw material, the raw material is mixed with a suitable solvent, and swollen to obtain a suspension as a spinning dope, then the spinning dope is sheared, mixed uniformly and untwisted via a screw extruder, and extrusion-stretched via a spinning pack and condensed and formed to obtain gelatinized pre-oriented filaments, and then the gelatinized pre-oriented filaments are extracted, dried and ultra-stretched to obtain ultra-high molecular weight polyethylene fibers.

UHMWPE has high strength and high modulus performance, because after the UHMWPE powder is dissolved in a solvent, the entanglement among molecular chains is disentangled at some degree, the gelatinized pre-oriented filaments formed by extruding via a spinneret and flash cooling keep the disentangled state of molecular chains in the filaments; and then extracted and multistage ultra-hot-stretched to fully extend the PE macromolecular chain in the axial direction, so that the crystallinity and the degree of orientation are both improved correspondingly. At the same time, the chain-folded lamellae in the molecular structure are converted into extended chains, so as to obtain high-strength and high-modulus polyethylene fibers.

The thinner the UHMWPE single filament and the better the fiber mechanical performance, the thinner the single filament and the softer the hand feeling of the fabric prepared therefrom according to the Griffth formula. However, in the gel spinning process for UHMWPE fibers, it is necessary to perform higher-stretching for the gelatinized pre-oriented filaments, which has a very high demand for drawability and crystalline structure of the gelatinized pre-oriented filaments. The existing technique only can realize subsequent hot stretching with a factor of 30-40, when the stretching factor exceeds the above stretching factor, single- or multi-fiber breakage of the UHMWPE fiber bundle usually occurs.

The inventor has studied and found that the crystallization among molecular chains not only appears in hot stretching process. In fact, when the spinning feed solution is sheared in a screw and ejected through a spinneret and flash-cooled and formed to obtain freshly formed filaments, part of the disentangled macromolecular chains firstly form a shish-kebab center line part having extended chain crystal structure under the action of orientation, the shish-kebab center line part can be used as crystal nucleus to induce and generate a series of chain-folded lamellas, so as to constitute a shish-kebab structure. In this way, in the subsequent hot stretching process, after the folded chain of the molecular chain is gradually opened and stretched, lamella generates recrystallization in the destroyed process, and the orthorhombic system is partially converted into a more stable hexagonal crystal system, so as to obtain a molecular crystal structure in the form of orthorhombic system and hexagonal crystal system together. The inventor has further studied and found that the reason why the UHMWPE fiber bundle has occurred partial fiber breakage in the subsequent high-stretching process is that in the molecular crystal structure of the fibers, the arrangement of the orthorhombic system and the hexagonal crystal system is nonuniform, resulting in the inhomogeneity of fiber mechanical performance, and partial mechanical performance of the fiber is relatively poor, so that in the high-stretching process, fiber breakage easily occurs at the part with relatively weak mechanical performance, therefore it is difficult to realize relatively high-factor stretching.

Accordingly, the present invention contemplates the adjustment for gel spinning process to improve the uniformity of shish-kebab formation in gelatinized pre-oriented filaments, thus improving the arrangement uniformity of orthorhombic system and hexagonal crystal system formed after the subsequent hot stretching and recrystallization, and finally improving the homogeneity of fiber mechanical performance, so as to realize single filament fine denier production and achieve high strength and high modulus and excellent performance.

DESCRIPTION OF THE INVENTION

The technical problem solved by the present invention is to provide a method for preparing gelatinized pre-oriented filaments capable of realizing high-stretching and ultra-high molecular weight polyethylene fibers having lower denier per filament and better mechanical performance.

In view of this, the present invention provides a method for preparing gelatinized pre-oriented filaments, comprising: feeding a spinning dope into a twin-screw extruder for blending and extruding the same to obtain a first spinning solution having a non-Newtonian index of 0.1-0.8 and a structural viscosity index of 10-50; feeding the first spinning solution into a spinning box, and stretching at a spinneret with a factor of 5-20 so as to obtain a second spinning solution; and flash cooling and curing the second spinning solution to obtain the gelatinized pre-oriented filaments.

Preferably, the content of ultra-high molecular weight polyethylene in the spinning dope is 5 wt %-20 wt %.

Preferably, the content of ultra-high molecular weight polyethylene in the spinning dope is 8 wt %-12 wt %.

Preferably, the first spinning solution has a preferable non-Newtonian index of 0.3-0.6 and a preferable structural viscosity index of 20-30.

Preferably, wherein the ultra-high molecular weight polyethylene has a weight average molecular weight of $3-5\times10^6$.

Preferably, the ultra-high molecular weight polyethylene contains a first ultra-high molecular weight polyethylene and a second ultra-high molecular weight polyethylene at a weight ratio of 3-8:1, wherein the first ultra-high molecular weight polyethylene has a weight-average molecular weight of $4-5\times10^6$, and the second ultra-high molecular weight polyethylene has a weight-average molecular weight of $3-4\times10^6$.

Preferably, the twin-screw extruder has an inlet temperature of 90-120° C., an intermediate shear section temperature of 240-280° C., and an outlet temperature of 280-350° C.

Preferably, the temperature at the first zone to that at the fourth zone of the intermediate shear section is 240-250° C., 250-270° C., 250-270° C., and 270-280° C.

Preferably, the flash cooling time is 0.05 s-2 s, and the temperature difference is 150-320° C.

The present invention also provides gelatinized pre-oriented filaments prepared by the above method, wherein the crystallinity is 15%-35%.

The present invention also provides a method for preparing ultra-high molecular weight polyethylene fibers, comprising: preparing gelatinized pre-oriented filaments according to the above method; subjecting the gelatinized pre-oriented filaments to stand for equilibration; pre-stretching, extracting, drying and positively stretching for at least two stages the equilibrated gelatinized pre-oriented filaments sequentially, during the pre-stretching, extracting, drying and positive stretching process, the total stretching factor applied to the gelatinized pre-oriented filaments is of 40-55, and the ultra-high molecular weight polyethylene fibers are obtained after the positive stretching.

Preferably, also comprising: applying negative stretching with a factor of 0.7-0.9 to the stretched ultra-high molecular weight polyethylene fibers at 90-120° C.

The present invention also provides ultra-high molecular weight polyethylene fibers prepared by the above method, wherein the denier per filament is 1.0-2.2 D, the crystallinity is greater than 81%, the degree of orientation is greater than 90%, and the intrinsic viscosity is 8-17 dl/g.

The present invention provides a method for preparing gelatinized pre-oriented filaments, the method comprises: feeding a spinning dope into a twin-screw extruder for blending and shearing the same to obtain a first spinning solution having a non-Newtonian index of 0.1-0.8 and a structural viscosity index of 10-50; pre-stretching the first spinning solution with a factor of 5-20; and finally flash cooling the pre-stretched material to obtain gelatinized pre-oriented filaments. The first spinning solution with a non-Newtonian index of 0.1-0.8 and a structural viscosity index of 10-50 is subjected to high-pre-stretching and flash cooling, which facilitates the formation of gelatinized pre-oriented filaments with a uniform shish-kebabs structure. As the gelatinized pre-oriented filaments have a relatively uniform and perfect shish-kebabs structure, during the subsequent ultra-stretching process, the shish-kebabs is destroyed and recrystallized, so that the conversion from orthorhombic system into hexagonal crystal system is more complete, and the coexisting two crystallographic forms are in uniform arrangement to realize relatively-high-factor stretching, and achieve better stretchability, so as to obtain ultra-high molecular weight polyethylene fibers with lower denier per filament and better mechanical performance.

It showed in the test that ultra-high molecular weight polyethylene fibers prepared from the gelatinized pre-oriented filaments have the number of broken filament ends per 10 km of not more than 2 stretched at 40-55 fold, and the prepared ultra-high molecular weight polyethylene fibers have denier per filament of less than 2.2 D, strength of greater than 35 cN/dtex, and modulus of greater than 1,150 cN/dtex, and have excellent mechanical performance.

DESCRIPTION OF THE PREFERRED EMBODIMENTS

In order to further understand the present invention, examples are incorporated below to describe the preferred embodiments of the present invention. However, it is to be understood that the detailed descriptions merely describe the feathers and advantages of the present invention, but the claims of the present invention is not limited thereto.

The example of the present invention discloses a method for preparing gelatinized pre-oriented filaments, comprising: feeding a spinning dope into a twin-screw extruder for blending and extruding the same to obtain a first spinning solution having a non-Newtonian index of 0.1-0.8 and a structural viscosity index of 10-50; feeding the first spinning solution into a spinning box, and stretching at a spinneret with a factor of 5-20 so as to obtain a second spinning solution; and flash cooling and curing the second spinning solution to obtain gelatinized pre-oriented filaments.

Non-Newtonian index n represents the strength of the non-Newtonian behavior of a melt, and structural viscosity index ($\Delta\eta$) is an important parameter characterizing the structurization degree of a spinning solution. The inventor has found that when a material has a non-Newtonian index of 0.1-0.8 and a structural viscosity index of 10-50, relatively-high-factor-stretching can be carried out to it at a spinneret, which facilitates to the formation of a uniform shish-kebabs structure. Therefore, in the present invention, a spinning dope is fed into a twin screw extruder firstly, blended and sheared in the twin screw extruder to obtain a first spinning solution with a non-Newtonian index of 0.1-0.8 and a structural viscosity index of 10-50. The first spinning solution has a preferable non-Newtonian index of 0.2-0.6 and a preferable structural viscosity index of 15-38.

In this specification, the spinning dope refers to a solution obtained by dissolving ultra-high molecular weight polyethylene powders in a solvent well known to those skilled in the art. The content of ultra-high molecular weight polyethylene in the spinning dope used in this step is preferably 5 wt %-20 wt %, more preferably 6 wt %-15 wt %, and most preferably 8 wt %-12 wt %. The application of spinning dope with relatively high solid content facilitates the improvement of spinning efficiency, however, as the increase of the solid content of the spinning dope, the spinnability of the spinning dope is reduced, this requires the increase of filament extrusion temperature, but the increase of the filament extrusion temperature easily causes more serious degradation of material, thereby causing the decrease of mechanical performance of the finally obtained ultra-high molecular weight polyethylene fibers. In the present invention, in order to improve the spinnability of the spinning dope with high solid content, for the spinning dope with a concentration of 8 wt %-12 wt %, the non-Newtonian index of the first spinning solution is preferably controlled at 0.3-0.6, and the structural viscosity index is preferably 20-30, the first spinning solution with the above performance can realize extrusion and high-stretching at a relatively low temperature, thus avoiding the degradation of the spinning dope occurred at a high temperature, and ensuring the mechanical performance of fibers while improving the spinning efficiency.

The structural viscosity index of the material is related to the number of entanglement points of the macromolecular chain in the material, and it has a certain relationship between the number of the entanglement points of the macromolecular chain in the material and molecular weight thereof. In order to easily obtain a first spinning solution with a structural viscosity index of 10-50, it is used in the present invention preferably a preferable ultra-high molecular weight polyethylene with weight-average molecular weight of $3-5 \times 10^6$, and a more preferable first ultra-high molecular weight polyethylene and second ultra-high molecular weight polyethylene at a weight ratio of 3-8:1, the first ultra-high molecular weight polyethylene has a weight-average molecular weight of $4-5 \times 10^6$, and the second ultra-high molecular weight polyethylene has a weight-average molecular weight of $3-4 \times 10^6$. The ultra-high molecular weight polyethylene powders used in the present invention are preferably in the state of the Gaussian distribution, and preferably have a particle diameter of 60-200 mesh.

The spinning solvent in the spinning dope is preferably a mixture obtained by mixing a cycloalkane and a chain hydrocarbon isomer according to a ratio of 85-90:10-15, the carbon atom number of the cycloalkane and the chain hydrocarbon is preferably 25-50, and more preferably 30-40. The spinning solvent can be a spinning solvent used in a ultra-high molecular weight polyethylene spinning solution well known to those skilled in the art, such as white oil which has no gas volatilizing below 400° C., a preferable initial boiling point of higher than 450° C., a preferable density of 0.84-0.87 g/cm$^3$, and a preferable flash point of higher than 260° C. Particularly it can be one of mineral oil, paraffin oil and white oil, as for white oil, it can be 5# white oil, 7# white oil, 10# white oil, 15# white oil, 22# white oil, 26# white oil, 32# white oil, 46# white oil, 68# white oil, 100# white oil and 150# white oil well known to those skilled in the art.

The case where the spinning dope is treated in the twin screw extruder also has an important influence on the non-Newtonian index and structural viscosity index of the material. It is studied and shown that the non-Newtonian index of the material decreases as the temperature increases, and the structural viscosity index of the material decreases as the temperature increases. Based on the above studies, the present invention preferably sets the inlet temperature of the extruder at 90-120° C., the intermediate extrusion temperature at 240-280° C., and the outlet temperature at 280-350° C. The temperatures at the first zone to that at the fourth zone of the intermediate extrusion are preferably at 240-250° C., 250-270° C., 250-270° C. and 270-280° C. in sequence. The above temperature setting is advantageous for the full entanglement of the macromolecular chains and the achievement of a material with a non-Newtonian index of 0.1-0.8 and a structural viscosity index of 10-50, and the rotation speed of the screw is preferably 150 r/min-280 r/min.

Relatively high-factor pre-stretching can be realized for the first spinning solution prepared by the above method, and the relatively high factor of the pre-stretching is used for ensuring the formation of a uniform shish-kebabs structure during the stretching process, and the specific steps are that feeding the first spinning solution into a spinning box, stretching at a spinneret with a factor of 5-20, and obtaining a second spinning solution after the stretching. The present invention preferably controls the stretching factor of the first spinning solution at the spinneret to be 8-30, more preferably 8-12, and the above stretching factor is more advantageous for the uniformity of shish-kebabs formation. The extrusion temperature of the spinning box is preferably 285-320° C.

In gel spinning process, the aperture of the spinneret orifice is preferably 0.8 mm-3 mm, the length-diameter ratio L/D of the spinneret orifice is preferably 8/1-20/1, and the extrusion rate of the second spinning solution is preferably set at 3 m/min-6 m/min.

The second spinning solution is extruded from the spinneret orifice and then flash-cooled to form gelatinized pre-oriented filaments. The time after the second spinning solution is extruded from the spinneret orifice and before it falls into the water tank is the flash cooling time, and the second spinning solution is still in the stretched state within the flash cooling time, so that the flash cooling time has an important influence on the shish-kebabs structure and crystalline integrity in the gelatinized pre-oriented filaments; if the flash cooling time is too short, the crystal form is not perfect; and if the flash cooling time is too long, the further stretching will destroy the crystal form and make it become discontinuous and nonuniform. Therefore, the present invention preferably controls the flash cooling time to be 0.05 s-2 s, and the temperature difference of flash cooling is preferably 150-320° C. According to the above method, gelatinized pre-oriented filaments with a uniform and continuous shish-kebabs structure can be obtained. The crystallinity of the gelatinized pre-oriented filaments is preferably 15%-35%, and more preferably 18%-32%.

The present invention also provides gelatinized pre-oriented filaments obtained by the above method, with the crystallinity of 15%-35%. Since the gelatinized pre-oriented filaments have a relatively uniform and perfect shish-kebabs structure, and more complete conversion from orthorhombic system to hexagonal crystal system in the subsequent breakage and recrystallization of shish-kebabs is achieved, and the arrangement of two kinds of crystal forms is relatively uniform, it can realize relatively high-factor stretching, so as to obtain ultra-high molecular weight polyethylene fibers with a lower denier per filament and a better mechanical performance.

The present invention also provides a method for preparing ultra-high molecular weight polyethylene fibers, comprising: preparing the gelatinized pre-oriented filaments according to the above method; subjecting the gelatinized pre-oriented filaments to stand for equilibration; pre-stretching, extracting, drying and performing at least two stages positive stretching for the gelatinized pre-oriented filaments after standing treatment sequentially, during the pre-stretching, extracting, drying and positive stretching process, the total stretching factor applied to the gelatinized pre-oriented filaments is of 40-55, and ultra-high molecular weight polyethylene fibers are obtained after the positive stretching.

The process for preparing the gelatinized pre-oriented filaments in the method for preparing ultra-high molecular weight polyethylene fibers provided in the present invention is the same as the above process. The obtained gelatinized pre-oriented filaments have a certain residual internal stress, so that it is necessary to subject the obtained gelatinized pre-oriented filaments to stand for equilibration; in this case, the filaments will have a certain shrinkage to effectively reduce the original internal stress. The standing temperature is preferably 5-30° C., and more preferably 15-25° C., and the standing time is at least 12 hr.

After that, it is necessary to selectively use a proper solvent to extract the solvent in the gelatinized pre-oriented filaments, wherein the selected extractant should have good intermiscibility with the solvent, and it should also have a lower boiling point and a high volatility. The extractant used can be a highly volatile lower paraffin hydrocarbon or halogenated hydrocarbon during the course of the extraction. For instance, when paraffin oil is used as solvent, the solvent gasoline is selected as the extractant.

It is necessary to dry the gelatinized pre-oriented filaments after extraction so as to volatilization of the extractant. The drying temperature is preferably 40-80° C. In order to accelerate the volatilization of the extractant, it is necessary to apply a certain tension to the gel protofilaments while drying to make the dried protofilaments in the tensioned state.

The gelatinized pre-oriented filaments are extracted and dried to obtain protofilaments, and then at least two stages positive stretching are applied to the protofilaments to obtain ultra-high molecular weight polyethylene fibers, wherein the temperature of the positive stretching is 120-160° C., and the stretching factor is preferably 5-15. The stretching factor herein refers to the ratio of feed rate of fiber stretched by a stretching machine to that before being stretched. The positive drawing in the present invention refers to the drawing with a stretching factor of larger than 1.

During the process for pre-stretching, extracting, drying and at least two stages positive stretching of the filaments, the total stretching factor applied to the filaments is of 40-55. Since the shish-kebab structure in the gelatinized pre-oriented filaments is relatively uniform, the shish-kebab structure in the protofilaments before stretching is also relatively uniform, under the action of traction force, the arrangement of orthorhombic system and hexagonal crystal system formed after recrystallization of the protofilaments is relatively uniform, so that the protofilaments can realize multi-stage high-factor-stretching, ensuring that even when the stretching factor reaches 40-55, a single protofilament breakage occurs rarely.

The present invention preferably performs two stages positive stretching for the protofilaments, particularly comprising the preferable steps as follows: performing first-stage stretching for the dried filaments at 120-150° C., and then performing second-stage stretching for the protofilaments at 130-160° C.

The present invention also preferably applies negative stretching with a stretching factor of smaller than 1 to the positive-stretched ultra-high molecular weight polyethylene fibers at 90-120° C. Under the condition of relatively high temperature negative stretching, fibers will not generate tensile deformation, wherease thermal shrinkage deformation occurs under the action of internal stress, thus it can effectively release the internal stress. The stretching factor of the negative stretching is preferably of 0.7-0.9.

The present invention also provides ultra-high molecular weight polyethylene fibers prepared by the above method, with the denier per filament of 1.0 D-2.2 D, the crystallinity of greater than 81%, and preferably of 81%-88%, the degree of orientation of greater than 90%, and preferably of 90%-99%, and the intrinsic viscosity of 8-17 dl/g. The intrinsic viscosity is determined by using decahydronaphthalene as a solvent at 135° C. The fiber has a low denier per filament, and a relatively high crystallinity, degree of orientation and molecular weight. Therefore, it has better mechanical performance, and the fabric prepared therefrom is flexible and has uniform mechanical performance, and it can be used as bullet resistant and/or stab resistant materials.

In order to further understand the present invention, the method for preparing gelatinized pre-oriented filaments and ultrahigh molecular weight polyethylene fibers provided in the present invention will be further described below with reference to the examples, but the scope of the present invention is not limited thereto.

The first ultra-high molecular weight polyethylene powder has a weight-average molecular weight of $4.8 \times 10^6$, the second ultra-high molecular weight polyethylene powder has a weight-average molecular weight of $3.2 \times 10^6$, the particle size of powders is 80-100 mesh, and the used solvent is 120# white oil.

Non-Newtonian index in the following examples is calculated by the formula (I): lg $\eta_a$=lg K+(n−1) lg γ(I); in the formula (I), $\eta_a$ represents apparent viscosity, γ represents shear rate, and K represents spinneret extrusion temperature.

Structural viscosity index is calculated by the formula (II):

$$lg\eta_a = -\frac{\Delta\eta}{100}\gamma^{1/2} + C; \quad (II)$$

slope can be calculated by curve fitting, and then Δη can be calculated.

Example 1

1. 88 kg of white oil was added into a swelling kettle and stirred, 10 kg of the first ultra-high molecular weight polyethylene powder and 2 kg of the second ultra-high molecular weight polyethylene powder were added under stirring, stirred at a stirring rate of 2,500 rpm, heated to 105° C., held for 50 min to obtain a spinning dope, wherein the content of the ultra-high molecular weight polyethylene in the spinning dope was 12 wt %.

2. The spinning dope obtained in step 1 was fed into a twin-screw extruder, sheared, blended and extruded to obtain a first spinning solution, wherein the technological parameters of the twin-screw extruder were listed in Table 1, and the non-Newtonian index and structural viscosity index of the first spinning solution were listed in Table 2.

3. The first spinning solution prepared in step 2 was fed into a spinning box to obtain a second spinning solution, wherein the technological parameters of the spinning box were listed in Table 1.

4. The spinning solution extruded by the spinning box was stretched with a factor of 12, flash-cooled by 200-220° C. in 0.5 s to obtain a gelatinized pre-oriented filament bundle (40 roots), wherein the crystallinity of the gelatinized pre-oriented filament prepared in the example was test to be 32%.

5. The obtained gelatinized pre-oriented filament bundle was collected and placed in a holding barrel, and subjected to stand for equilibration for 15 hr.

6. The gelatinized pre-oriented filament bundle after standing treatment was pre-stretched and then extracted with kerosene, subjected to first-stage drying at 50° C. and second-stage drying at 55° C., respectively, to obtain a protofilament fiber bundle, wherein the stretching factors in the above pre-stretching, extracting and drying process were listed in Table 1.

7. The protofilament fiber bundle obtained in step 6 was subjected to two stages positive stretching and one-stage negative stretching, wherein the stretching technological parameters were listed in Table 1. The number of broken filament ends per 10 km of the protofilament fiber and the mechanical performance of the obtained ultra-high molecular weight polyethylene fiber were both listed in Table 3.

Example 2

1. 92 kg of white oil was added into a swelling kettle and stirred, 6 kg of the first ultra-high molecular weight polyethylene powder and 2 kg of the second ultra-high molecular weight polyethylene powder were added under stirring, stirred at a stirring rate of 2,500 rpm, heated to 105° C., held for 50 min to obtain a spinning dope, wherein the content of the ultra-high molecular weight polyethylene in the spinning dope was 8 wt %.

The crystallinity of the gelatinized pre-oriented filaments prepared by the Example was test to be 27%. The rest of the steps were the same as those in Example 1, and the specific technological parameters were listed in Table 1. Non-Newtonian index and structural viscosity index of the first spinning solution were listed in Table 2, and the number of broken filament ends per 10 km of the protofilament fiber in the stretching process and the mechanical performance of the obtained ultra-high molecular weight polyethylene fibers were both listed in Table 3.

Example 3

1. 94 kg of white oil was added into a swelling kettle and stirred, 6 kg of the first ultra-high molecular weight polyethylene powder was added under stirring, stirred at a stirring rate of 2,500 rpm, heated to 105° C., held for 50 min to obtain a spinning dope, wherein the content of the ultra-high molecular weight polyethylene in the spinning dope was 6 wt %.

The crystallinity of the gelatinized pre-oriented filaments prepared by the Example was test to be 25%. The remaining steps were the same as those in Example 1, and the specific technological parameters were listed in Table 1. Non-Newtonian index and structural viscosity index of the first spinning solution were listed in Table 2, and the number of broken filament ends per 10 km of the protofilament fiber in the stretching process and the mechanical performance of the obtained ultra-high molecular weight polyethylene fiber were both listed in Table 3.

Example 4 TO Example 6

Spinning dope and spinning process were both the same as those in example 3, and specific technological parameters were listed in Table 1. Non-Newtonian index and structural viscosity index of the first spinning solution were listed in Table 2, and the number of broken filament ends per 10 km of the protofilament fiber in the stretching process and the mechanical performance of the obtained ultra-high molecular weight polyethylene fiber were both listed in Table 3.

Comparative Example 1 to Comparative Example 2

Steps of the above two comparative examples were the same as those in example 3, and specific technological parameters were listed in Table 1. Non-Newtonian index and structural viscosity index of the first spinning solution were listed in Table 2, and the number of broken filament ends per 10 km of the protofilament fiber in the stretching process and the mechanical performance of the obtained ultra-high molecular weight polyethylene fiber were both listed in Table 3.

TABLE 1

Spinning technological parameters in examples 1-6 and comparative examples 1-2

| | | Example 1 | Example 2 | Example 3 | Example 4 |
|---|---|---|---|---|---|
| Twin screw extruder | inlet temperature | 110° C. | 110° C. | 110° C. | 110° C. |
| | temperature at the first zone | 250° C. | 250° C. | 250° C. | 250° C. |
| | temperature at the second zone | 260° C. | 250° C. | 250° C. | 250° C. |
| | temperature at the third zone | 260° C. | 260° C. | 260° C. | 260° C. |
| | temperature at the fourth zone | 280° C. | 260° C. | 270° C. | 260° C. |
| | outlet temperature | 320° C. | 310° C. | 310° C. | 310° C. |
| | rotation speed of the screw | 190 rpm | 190 rpm | 180 rpm | 180 rpm |
| spinning box | aperture | 1.2 mm | 1.2 mm | 1.2 mm | 1.2 mm |
| | length-diameter ratio | 14/1 | 14/1 | 14/1 | 14/1 |
| | stretching factor | 18 | 10 | 12 | 6 |
| | extrusion temperature | 300° C. | 305° C. | 290° C. | 320° C. |
| | extrusion rate | 5 m/min | 4 m/min | 3 m/min | 6 m/min |
| flash cooling time | | 0.75 s | 0.94 s | 1.25 s | 0.625 s |
| flash cooling temperature difference | | 220° C. | 220° C. | 150° C. | 300° C. |
| stretching factor in pre-stretching process | | 2.8 | 2.6 | 2.7 | 2.2 |
| stretching factor in extracting process | | 1.7 | 1.8 | 1.6 | 2.1 |

TABLE 1-continued

Spinning technological parameters in examples 1-6 and comparative examples 1-2

|  |  | Example 1 | Example 2 | Example 3 | Example 4 |
|---|---|---|---|---|---|
| stretching factor in drying process |  | 1.6 | 1.7 | 1.6 | 1.8 |
| high-factor stretching | first-stage stretching temperature/ stretching factor | 120° C./ 2.8 | 120° C./ 2.7 | 125° C./ 2.9 | 125° C./ 2.65 |
|  | second-stage stretching temperature/ stretching factor | 130° C./ 1.9 | 130° C./ 2.0 | 135° C./ 1.8 | 135° C./ 2.0 |
|  | third-stage stretching temperature/ stretching factor | 140° C./ 1.5 | 140° C./ 1.3 | 145° C./ 1.45 | 145° C./ 1.2 |
|  | negative stretching temperature/ stretching factor | 100° C./ 0.9 | 100° C./ 0.9 | — | 100° C./ 0.89 |
| total stretching factor |  | 54.7 | 50.3 | 52.3 | 46.4 |

|  |  | Example 5 | Example 6 | Comparative example 1 | Comparative example 2 |
|---|---|---|---|---|---|
| Twin screw extruder | inlet temperature | 120° C. | 90° C. | 110° C. | 80° C. |
|  | temperature at the first zone | 250° C. | 240° C. | 250° C. | 270° C. |
|  | temperature at the second zone | 270° C. | 250° C. | 250° C. | 280° C. |
|  | temperature at the third zone | 270° C. | 250° C. | 260° C. | 300° C. |
|  | temperature at the fourth zone | 280° C. | 270° C. | 270° C. | 300° C. |
|  | outlet temperature | 340° C. | 280° C. | 310° C. | 310° C. |
|  | rotation speed of the screw | 200 rpm | 200 rpm | 180 rpm | 150 rpm |
| spinning box | aperture | 1.2 mm | 1.2 mm | 1.2 mm | 1.2 mm |
|  | length-diameter ratio | 14/1 | 14/1 | 14/13 | 14/1 |
|  | stretching factor | 10 | 10 |  | 5 |
|  | extrusion temperature | 310° C. | 300° C. | 290° C. | 300° C. |
|  | extrusion rate | 5 m/min | 4 m/min | 3 m/min | 3 m/min |
| flash cooling time |  | 0.75 s | 0.94 s | 1.25 s | 1.25 s |
| flash cooling temperature difference |  | 230° C. | 220° C. | 150° C. | 130° C. |
| stretching factor in pre-stretching process |  | 1.8 | 2.0 | 2.3 | 2.1 |
| stretching factor in extracting process |  | 1.6 | 1.9 | 2.1 | 1.8 |
| stretching factor in drying process |  | 2.2 | 1.6 | 1.8 | 1.6 |
| high-factor stretching | first-stage stretching temperature/ stretching factor | 125° C./ 2.7 | 120° C./ 2.6 | 130° C./ 2.8 | 130° C./ 2.6 |
|  | second-stage stretching temperature/ stretching factor | 135° C./ 1.7 | 130° C./ 1.9 | 150° C./ 1.6 | 150° C./ 1.8 |
|  | third-stage stretching temperature/ stretching factor | 145° C./ 2.0 | 140° C./ 2.0 | 150° C./ 1.1 | 150° C./ 1.4 |
|  | negative stretching temperature/ stretching factor | 100° C./ 0.85 | 100° C./ 0.8 | 100° C./ 0.9 | 100° C./ 0.9 |
| total stretching factor |  | 49.4 | 48 | 38.6 | 34.6 |

TABLE 2

Non-Newtonian index (n) and structural viscosity index (Δη) of the first spinning solution in examples 1-6 and comparative examples 1-2

|    | Example 1 | Example 2 | Example 3 | Example 4 | Example 5 | Example 6 | Comparative example 1 | Comparative example 2 |
|----|-----------|-----------|-----------|-----------|-----------|-----------|----------------------|----------------------|
| n  | 0.34226   | 0.46115   | 0.37159   | 0.73619   | 0.52796   | 0.19323   | 0.37159              | 0.85967              |
| Δη | 21.4      | 30.9      | 21.8      | 46.2      | 34.2      | 11.5      | 21.8                 | 53.6                 |

TABLE 3

Fiber mechanical performance in examples 1-6 and comparative examples 1-2

|  | Example 1 | Example 2 | Example 3 | Example 4 | Example 5 | Example 6 | Comparative example 1 | Comparative example 2 |
|---|---|---|---|---|---|---|---|---|
| crystallinity % | 88 | 85 | 87 | 81 | 82 | 83 | 75 | 70 |
| degree of orientation % | 99 | 96 | 98 | 92 | 94 | 94 | 87 | 81 |
| intrinsic viscosity dl/g | 17 | 15 | 16 | 10 | 14 | 12 | 8 | 8 |
| the denier per filament | 1.02 | 1.29 | 1.05 | 1.93 | 1.58 | 1.73 | 2.5 | 2.7 |
| modulus cN/dtex | 1387 | 1326 | 1356 | 1307 | 1333 | 1319 | 1207 | 1169 |
| strength cN/dtex | 38.9 | 37.9 | 38.3 | 33.4 | 35.2 | 34.5 | 30.3 | 29.1 |
| the number of broken filament ends per 10 km | 1 | 0 | 0 | 1 | 0 | 0 | 2 | 2 |

It is known from the above results that the ultra-high molecular weight polyethylene fiber prepared by the method provided in the present invention has the number of broken filament ends per 10 km of not more than 2 stretched at 40-55 fold, and the prepared ultra-high molecular weight polyethylene fiber has a denier per filament of smaller than 2.2 D, and has a higher strength and modulus.

The above description of the embodiment is only used to help understand the method of the present invention and its core ideas. But it should be noted that variations and/or modifications can be carried out by those skilled in the art without departing from the principles of the present invention, and these variations and/or modifications also fall within the scope of the claims in the present invention.

The disclosed embodiments described above enable those skilled in the art to implement or use the present invention. A variety of modifications of these embodiments will become apparent for those skilled in the art, and the general principles as defined herein may be implemented in other embodiments without departing from the spirit or scope of the present invention. Accordingly, the present invention will not be limited to the embodiments shown herein but accord to the widest range consistent with the principles and novel feature disclosed herein.

What is claimed is:

1. A method for preparing gelatinized pre-oriented filaments, comprising:
    feeding a spinning dope comprising ultra-high molecular weight polyethylene into a twin-screw extruder for blending and extruding the same to obtain a first spinning solution having a non-Newtonian index of 0.3-0.6 and a structural viscosity index of 20-30;
    feeding the first spinning solution into a spinning box, and stretching at a spinneret with a factor of 5-20 so as to obtain a second spinning solution; and
    flash cooling and curing the second spinning solution so as to obtain the gelatinized pre-oriented filaments,
    wherein the ultra-high molecular weight polyethylene contains a first ultra-high molecular weight polyethylene and a second ultra-high molecular weight polyethylene at a weight ratio of 3-8:1, in which the first ultra-high molecular weight polyethylene has a weight-average molecular weight of $4\text{-}5\times10^6$, and the second ultra-high molecular weight polyethylene has a weight-average molecular weight of $3\text{-}4\times10^6$.

2. The method according to claim 1, wherein a content of ultra-high molecular weight polyethylene in the spinning dope is 5 wt %-20 wt %.

3. The method according to claim 2, wherein the content of ultra-high molecular weight polyethylene in the spinning dope is 8 wt %-12 wt %.

4. The method according to claim 2, wherein the ultra-high molecular weight polyethylene has a weight-average molecular weight of $3\text{-}5\times10^6$.

5. The method according to claim 1, wherein the twin screw extruder has an inlet temperature of 90-120° C., an intermediate shear section temperature of 240-280° C., and an outlet temperature of 280-350° C.

6. The method according to claim 5, wherein a temperature at the first zone to that at the fourth zone of the intermediate shear section is sequentially 240-250° C., 250-270° C., 250-270° C., and 270-280° C.

7. The method according to claim 1, wherein the flash cooling has a time ranging from 0.05 s-2 s, and generates a temperature difference of 150-320° C.

8. A method for preparing ultra-high molecular weight polyethylene fibers, comprising:
    preparing gelatinized pre-oriented filaments by the method according to claim 1;
    subjecting the gelatinized pre-oriented filaments to stand for equilibration;

pre-stretching, extracting, drying and positively stretching for at least two stages the equilibrated gelatinized pre-oriented filaments sequentially, during the pre-stretching, extracting, drying and positively stretching process, the total stretching factor applied to the gelatinized pre-oriented filaments is of 40-55, and the ultra-high molecular weight polyethylene fibers are obtained after the positive stretching.

9. The method according to claim 8, wherein the method further comprises:
applying a negative-stretching with a factor of 0.7-0.9 to a stretched ultra-high molecular weight polyethylene fibers at 90-120° C.

10. The method according to claim 8, wherein the fibers have a denier per filament of 1.0 D-2.2 D, a crystallinity of greater than 81%, a degree of orientation of greater than 90%, an intrinsic viscosity of 8-17 dl/g, a stretch of greater than 35 cN/dtex, and a modulus of greater than 1150 cn/dtex.

11. A method of preparing gelatinized pre-oriented filaments, the method comprising:
feeding a spinning dope comprising ultra-high molecular weight polyethylene into a twin-screw extruder for blending and extruding the same to obtain a first spinning solution having a non-Newtonian index of 0.3-0.6 and a structural viscosity index of 20-30, wherein the ultra-high molecular weight polyethylene contains a first ultra-high molecular weight polyethylene and a second ultra-high molecular weight polyethylene at a weight ratio of 3-8:1, in which the first ultra-high molecular weight polyethylene has a weight-average molecular weight of $4\text{-}5\times10^6$, and the second ultra-high molecular weight polyethylene has a weight-average molecular weight of $3\text{-}4\times10^6$;
feeding the first spinning solution into a spinning box, and stretching at a spinneret with a factor of 5-20 so as to obtain a second spinning solution; and
flash cooling and curing the second spinning solution so as to obtain the gelatinized pre-oriented filaments, wherein the crystallinity of the filaments is 15%-35%.

12. A method of preparing ultra-high molecular weight polyethylene fibers, the method comprising:
feeding a spinning dope comprising ultra-high molecular weight polyethylene into a twin-screw extruder for blending and extruding the same to obtain a first spinning solution having a non-Newtonian index of 0.3-0.6 and a structural viscosity index of 20-30, wherein the ultra-high molecular weight polyethylene contains a first ultra-high molecular weight polyethylene and a second ultra-high molecular weight polyethylene at a weight ratio of 3-8:1, in which the first ultra-high molecular weight polyethylene has a weight-average molecular weight of $4\text{-}5\times10^6$, and the second ultra-high molecular weight polyethylene has a weight-average molecular weight of $3\text{-}4\times10^6$;
feeding the first spinning solution into a spinning box, and stretching at a spinneret with a factor of 5-20 so as to obtain a second spinning solution;
flash cooling and curing the second spinning solution so as to obtain gelatinized pre-oriented filaments;
subjecting the gelatinized pre-oriented filaments to stand for equilibration; and
pre-stretching, extracting, drying and positively stretching for at least two stages the equilibrated gelatinized pre-oriented filaments sequentially, during the pre-stretching, extracting, drying and positively stretching process, the total stretching factor applied to the gelatinized pre-oriented filaments is of 40-55, and the ultra-high molecular weight polyethylene fibers are obtained after the positive stretching,
wherein the denier per filament is 1.0 D-2.2 D, the crystallinity is greater than 81%, the degree of orientation is greater than 90%, and the intrinsic viscosity is 8-17 dl/g.

\* \* \* \* \*